Figures 1, 2:
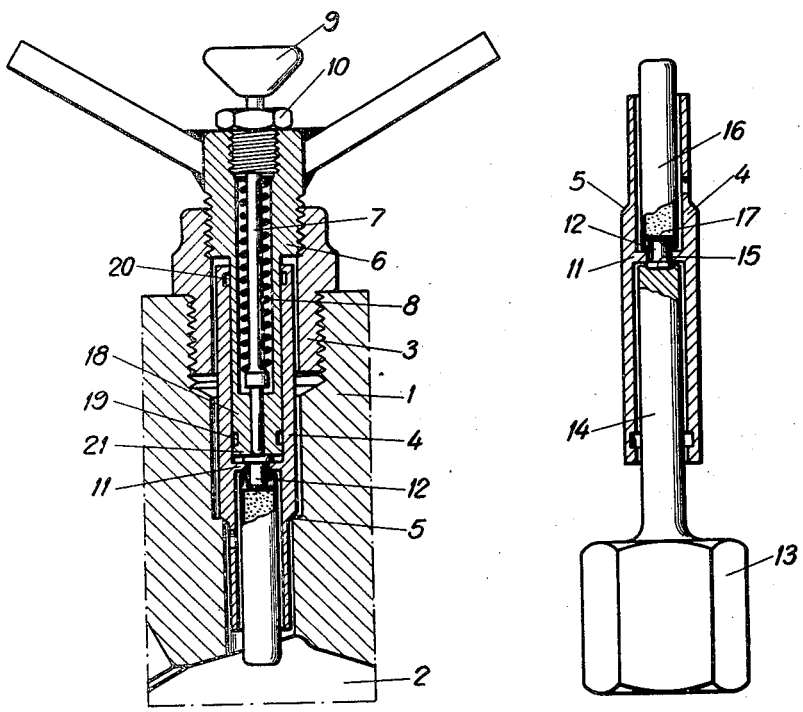

Patented Oct. 3, 1950

2,524,070

UNITED STATES PATENT OFFICE 2,524,070

DEVICE FOR STARTING OR REVERSING INTERNAL-COMBUSTION ENGINES

John Rutger Munck af Rosenschöld, Stockholm, Sweden, assignor to Aktiebolaget Atlas Diesel, Sickla, near Stockholm, Sweden, a corporation of Sweden Application September 5, 1946, Serial No. 694,947
In Sweden September 7, 1945

11 Claims. (Cl. 123—183)

1

The present invention relates to a device for starting or reversing internal combustion engines by means of a cartridge and a mechanism for firing said cartridge. One object of the invention is to reduce the risk that the cartridge is fired by mistake by means of the firing mechanism before said mechanism is placed in such a position on the engine that such firing may be carried out without danger for the persons in charge of the engine.

For this purpose I provide in an engine having a working chamber and a member movable upon firing of a cartridge into said working chamber to drive the engine a passage from the exterior to the working chamber, a member fitting in said passage and forming a space communicating with the working chamber and accomodating the cartridge, a mechanism for firing the cartridge, and means for bringing said mechanism in firing cooperative position relatively to the cartridge only upon securing the mechanism to the engine in position to trap the cartridge in said passage.

In some previously known starting devices using a cartridge the firing mechanism and a sleeve containing the cartridge are carried out or assembled as a unit which may be screwed onto the engine, and, consequently, the handling of such a unit before it is secured on the engine involves considerable risks since the cartridge can be fired at any time.

One embodiment of a device according to the invention is illustrated by way of example in the accompanying drawing. It should be understood, however, that the invention is by no means confined to this embodiment and various modifications may be made within the scope of the claims.

Fig. 1 is a section through a portion of the cylinder wall of an internal combustion engine including the device according to the invention ready for firing. Fig. 2 illustrates a ram rod and a sleeve with the cartridge in position therein.

The illustrated device according to the invention is disposed in a bore in the wall 1 of an internal combustion engine which bore leads to a combustion chamber 2 in said engine. The internal combustion engine may be of any design and the combustion chamber 2 may, for instance, be a portion of a working cylinder of a reciprocating engine having a piston movable in said cylinder and connected to the crank-shaft of the engine for driving the engine upon firing of the cartridge in known manner for starting or reversing the engine. The combustion chamber 2 may also form a portion of an auxiliary cylinder of an engine provided with a movable piston adapted to drive the engine upon firing of the cartridge.

2

The combustion chamber 2 may, furthermore, form a portion of a working chamber of any rotary internal combustion engine having a movable member displaceable upon firing of the cartridge in the chamber to drive the engine.

A nut 3 is secured in the bore in the wall 1 and a hollow sleeve 4 extends through said nut and the bore to the combustion chamber 2 with a loose fit. The sleeve 4 is provided with an external annular valve portion 5 which upon introduction of the sleeve in the bore cooperates with a corresponding seat formed in the wall of the bore. The sleeve 4 is pressed towards said seat when the firing mechanism incorporated in a winged screw 6 is screwed into the nut 3 and upon tightening forces the valve portion of the sleeve 4 towards the seat so that a perfect seal is obtained. Naturally the nut 3 may be omitted and the winged screw 6 screwed directly in the wall 1. The sleeve 4, furthermore, may be provided with screw threads or the like for securing it on the engine, the arrangement being such that the firing mechanism can be brought into firing cooperative position relative to the sleeve only by securing the mechanism to the engine.

The illustrated firing mechanism consists of a large winged screw 6 having a striker 7 axially movable therein and pressed towards the combustion chamber by a spring 8. The striker 7 may be pulled outwardly and the spring 8 compressed by means of the button 9. When said button is pulled the spring 8 is pressed towards a bushing 10 screwed into the winged screw 6.

At the middle of the sleeve 4 a transverse partition 11 is provided which is bored and forms a seat for an igniting means such as a cap 12. The interior of the sleeve 4 is thus divided in two compartments one of which is intended to accommodate the cartridge and to communicate with the combustion chamber and the other to fit a thin portion 18 of the firing mechanism. In order to simplify fitting of the cartridge in the sleeve 4 a nut 13 which may be one of the cylinder head nuts of the engine is formed as a ram rod 14 provided in its upper end with a recess or seat 15 for accommodating the flange of the cap 12. The powder charge of the cartridge is provided in a shell 16 having at one end a cavity or recess 17 corresponding with press fit to the small end of the cap 12. In order to adapt the sleeve 4 the cap 12 is first placed on the ram rod 14 and the sleeve 4 is then placed on the ram rod 14 so that the cap 12 projects through the bore in the partition 11. The cartridge shell 16 is then inserted through the opposite end of the sleeve 4 and pressed onto the cap 12. The sleeve 4 is now ready to be removed from the ram rod and to be brought into position in the bore in the cylinder wall 1. When this has been done the firing mechanism 6 is screwed into the nut 3 so that the thin portion 18 of the mechanism containing the striker 7 extends into the sleeve 4 towards the igniting cap 12. When the winged screw 6 has been tightened the cartridge may be fired by first pulling out the button 9 and then letting it go. The spring 8 then drives the striker towards the cap 12 causing the powder charge to be ignited. The powder gases then developed produce the necessary power for starting or reversing the engine in a manner known per se. During the continued operation of the engine the bottom flange of the cap 12 forms a sufficient means for sealing the opening in the partition 11 of the sleeve 4.

In order to enable the sleeve 4 to be pulled out in a simple manner the thin portion 18 of the winged screw 6 is provided with an external annular groove 19 close to the free end and the sleeve 4 at the outer end with an internal annular groove 20 in which the end flange 21 confined by the annular groove 19 on the portion 18 may grip for pulling out the sleeve 4 from the bore in the cylinder wall. When the winged screw 6 has been unscrewed and pulled out so far that the flange 21 is opposite the groove 20, the screw is moved slightly sidewise so that a portion of the flange 21 enters a portion of the groove 20. Thereafter the sleeve 4 may be pulled out by means of the screw 6. When the sleeve 4 has been pulled out renewed loading for the next start or reversing operation may be carried out in the manner described hereinabove.

The device above described should only be considered as an example and the details of the device may naturally be modified in several different ways within the scope of the claims.

What I claim is:

1. In a device for starting or reversing internal combustion engines upon firing of a cartridge into a working cylinder of said engine provided with a passage in a wall of said cylinder leading from the exterior to the interior of the cylinder, a sleeve fitting in said passage and forming a space communicating with the working cylinder and accommodating the cartridge, and a mechanism for firing the cartridge, said firing mechanism and said sleeve being so formed and arranged that they are capable of being brought in firing cooperative position relatively to one another only upon securing the mechanism to the engine in a position in which it traps the sleeve in the passage.

2. In a device for starting or reversing an internal combustion engine by means of a cartridge, a working chamber in said engine, a member movable upon firing of said cartridge into said working chamber to drive the engine, a passage in the engine from the exterior to the working chamber, a member fitting loosely in said passage and forming a space communicating with the working chamber and accommodating the cartridge, a mechanism for locking said member in the passage and for firing the cartridge, and means for bringing said mechanism in locking and firing cooperative position relatively to the member and the cartridge only upon securing the mechanism to the engine.

3. In a device for starting or reversing an internal combustion engine by means of a cartridge, a working chamber in said engine, a member movable upon firing of said cartridge into said working chamber to drive the engine, a passage in the engine from the exterior to the working chamber, a seat formed in the wall of said passage, a hollow sleeve fitting loosely in the passage and on said seat and forming a space communicating with the working chamber and accommodating the cartridge, a mechanism for firing said cartridge, and means for securing said firing mechanism to the engine as a unit and simultaneously locking said sleeve on the seat and bringing the firing mechanism in firing cooperative position relatively to the cartridge.

4. In a device for starting or reversing an internal combustion engine by means of a cartridge, a cylinder in said engine forming a combustion chamber, a piston movable in said cylinder to rotate the engine upon firing of said cartridge into said combustion chamber, a passage in said cylinder from the exterior to the combustion chamber, an annular seat formed in the wall of said passage, a hollow sleeve fitting loosely in the passage and forming an external annular valve portion fitting on said seat and an internal chamber accommodating the cartridge, a mechanism for firing said cartridge, and means for securing said firing mechanism to the cylinder as a unit and simultaneously locking said sleeve on the seat and bringing the firing mechanism in firing cooperative position relatively to the cartridge.

5. In a device for starting or reversing an internal combustion engine by means of a cartridge, a working chamber in said engine, a member movable upon firing of said cartridge into said working chamber to drive the engine, a passage in the engine from the exterior to the working chamber, a hollow sleeve fitting in said passage, a partition in said sleeve confining a compartment in one end of the sleeve for accommodating the cartridge and communicating with the working chamber of the engine when the sleeve is in position in the passage, an opening in said partition admitting the introduction therethrough from the other end of the sleeve of an igniting means for the cartridge, a firing mechanism for the cartridge, and means for bringing said firing mechanism in firing cooperative position relatively to said igniting means.

6. A device according to claim 5, in which the cartridge comprises a shell enclosing a powder charge and is provided with a recess in one end for receiving a portion of said igniting means, a portion on the igniting means adapted to seal the opening in the partition in the sleeve, and a further portion on the igniting means adapted to project through said opening and to enter the recess of the cartridge with a press fit.

7. In a device for starting or reversing an internal combustion engine by means of a cartridge, a working chamber in said engine, a member movable upon firing of said cartridge into said working chamber to drive the engine, a passage in the engine from the exterior to the working chamber, a member fitting in said passage forming a space communicating with the working chamber and accommodating the cartridge, a mechanism for firing the cartridge, means for bringing said firing mechanism in firing cooperative position relatively to the cartridge, and a gripper on said mechanism for gripping said member to pull it out of the passage after firing the cartridge.

8. A charging device for the sleeve according to claim 5 comprising a ram rod fitting a compartment in one end of the sleeve confined by the partition, a seat on said ram rod for accommodating the igniting means for pushing it into the sleeve partially through the opening in the partition and into the recess in the cartridge so as to hold the cartridge and igniting means in place in the sleeve.

9. In a device for starting or reversing internal combustion engines upon firing of a cartridge into a working cylinder of said engine provided with a passage in a wall of said cylinder leading from the exterior to the interior of the cylinder, a hollow sleeve for insertion in said passage, an external abutment on said sleeve for engaging a corresponding seat in the wall of the passage when the sleeve is installed, and an internal transversely extending partition in the sleeve defining a compartment in one end of the sleeve for an explosive cartridge and a second compartment in the other end of the sleeve for the introduction of a percussion cap for firing the cartridge, there being an opening in said partition for permitting said percussion cap to project through said partition from said second compartment into the cartridge positioned in said first mentioned compartment.

10. A sleeve according to claim 9, in which the external abutment consists of an annular conical shoulder adapted to engage the seat in the wall of the passage.

11. A sleeve according to claim 9, in which an annular groove is provided in the inner wall of the portion of the sleeve forming said second compartment for engagement with an extracting element for withdrawing the sleeve from the passage in the wall of the working cylinder.

JOHN RUTGER MUNCK AF ROSENSCHÖLD.

REFERENCES CITED

The following references are of record in the file of this patent:

UNITED STATES PATENTS

| Number | Name | Date |
|---|---|---|
| 531,807 | Raymond | Jan. 1, 1895 |
| 1,356,648 | Mogue | Oct. 26, 1920 |
| 1,771,776 | Dal Lago | July 29, 1930 |

FOREIGN PATENTS

| Number | Country | Date |
|---|---|---|
| 812,647 | France | of 1937 |
| 505,501 | Great Britain | of 1939 |